US012563415B2

(12) United States Patent
Rajpoot et al.

(10) Patent No.: US 12,563,415 B2
(45) Date of Patent: Feb. 24, 2026

(54) SYSTEMS AND METHODS FOR DETERMINING CALL MUTING AREAS

(71) Applicant: Rakuten Symphony, Inc., Tokyo (JP)

(72) Inventors: Atul Rajpoot, Indore (IN); Durgesh Rathore, Indore (IN); Sudeep Kumar Jain, Indore (IN); Nilesh Bankar, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 310 days.

(21) Appl. No.: 18/041,465

(22) PCT Filed: Jan. 19, 2023

(86) PCT No.: PCT/US2023/011122
§ 371 (c)(1),
(2) Date: Feb. 13, 2023

(87) PCT Pub. No.: WO2024/155280
PCT Pub. Date: Jul. 25, 2024

(65) Prior Publication Data
US 2025/0080998 A1 Mar. 6, 2025

(51) Int. Cl.
*H04W 24/02* (2009.01)
*H04W 24/08* (2009.01)

(52) U.S. Cl.
CPC ........... *H04W 24/02* (2013.01); *H04W 24/08* (2013.01)

(58) Field of Classification Search
None
See application file for complete search history.

(56) References Cited

U.S. PATENT DOCUMENTS

| | | | | |
|---|---|---|---|---|
| 9,439,081 | B1 * | 9/2016 | Knebl | G06N 20/00 |
| 11,259,191 | B2 * | 2/2022 | Chen | H04W 16/18 |
| 2007/0121852 | A1 | 5/2007 | Taylor et al. | |
| 2012/0220290 | A1 * | 8/2012 | Awad | H04W 4/02 |
| | | | | 455/423 |
| 2013/0053023 | A1 | 2/2013 | Meredith et al. | |
| 2015/0094054 | A1 | 4/2015 | Osman et al. | |

(Continued)

FOREIGN PATENT DOCUMENTS

| | | |
|---|---|---|
| CN | 102131202 A | 7/2011 |
| CN | 105188030 A | 12/2015 |

OTHER PUBLICATIONS

International Search Report issued May 17, 2023 in Application No. PCT/US2023/011122.

(Continued)

*Primary Examiner* — Adolf Dsouza
(74) *Attorney, Agent, or Firm* — Sughrue Mion, PLLC

(57) ABSTRACT

A method of identifying call muting areas includes dividing a network cluster into a plurality of grids, determining a call muting percentage of at least one first grid of the plurality of grids, determining whether the call muting percentage of the at least one first grid is greater than a predetermined call muting percentage threshold, and generating at least one call muting polygon including at least a portion of the at least one first grid based on determining that the call muting percentage of the at least one first grid is greater than the predetermined call muting percentage threshold.

20 Claims, 9 Drawing Sheets

(56)        References Cited

U.S. PATENT DOCUMENTS

2015/0126204 A1*  5/2015 Rodriguez Crespo ......................
                                              H04W 16/30
                                              455/446
2016/0219482 A1*  7/2016 Smith  ................... H04W 36/30
2016/0353412 A1   12/2016 Kaufman
2023/0217357 A1*  7/2023 Rathore  ............... H04W 72/51
                                              370/329

OTHER PUBLICATIONS

Written Opinion issued May 17, 2023 in Application No. PCT/
US2023/011122.

* cited by examiner

502 — Validate Data Samples.

504 — Generate Grids.

506 — Determine Call Muting % For Grids

508 — Determine a Priority for Grids.

510 — Group Samples with Geography.

512 — Generate Tiles.

514 — Discard Data Sets.

516 — Generate a Call Muting Polygon.

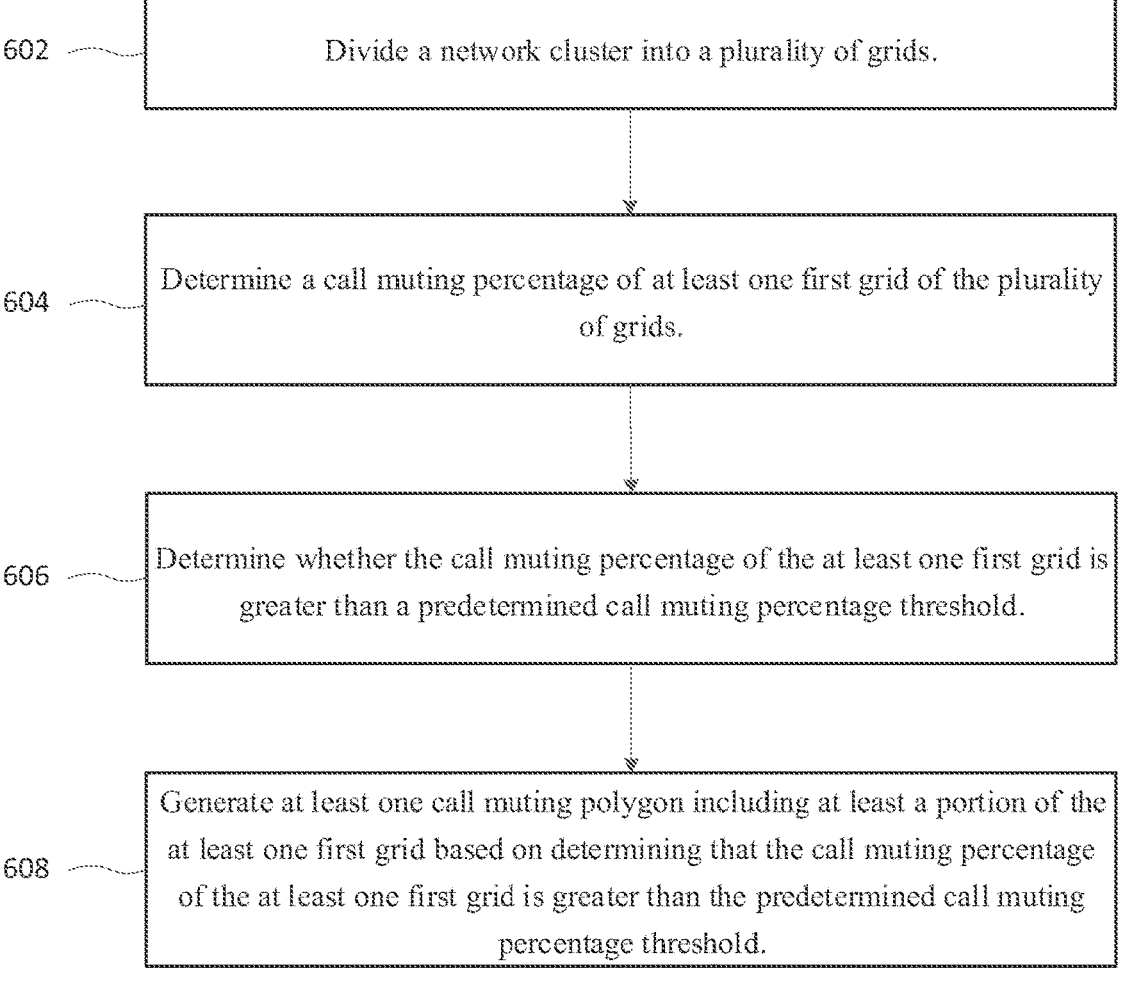

602 — Divide a network cluster into a plurality of grids.

604 — Determine a call muting percentage of at least one first grid of the plurality of grids.

606 — Determine whether the call muting percentage of the at least one first grid is greater than a predetermined call muting percentage threshold.

608 — Generate at least one call muting polygon including at least a portion of the at least one first grid based on determining that the call muting percentage of the at least one first grid is greater than the predetermined call muting percentage threshold.

FIG. 6

SYSTEMS AND METHODS FOR DETERMINING CALL MUTING AREAS

CROSS REFERENCE TO RELATED APPLICATIONS

This application is a National Stage of International Application No. PCT/US2023/011122 filed Jan. 19, 2023.

BACKGROUND

1. Field

Apparatuses and methods consistent with example embodiments of the present disclosure relate to systems and methods for determining call muting areas within a network.

2. Description of Related Art

In a network environment having a number of user equipments (UEs) active therein, when a UE is conducting a call as well as moving within the network environment, the UE may require handovers to be performed between base stations to maintain the call. However, call mutings may occur during this process (e.g., calls being connected but no voice information being sent and/or received). The call mutings may not necessarily be UE specific (e.g., the call muting may not be the fault of the UE), and such call mutings may indicate an inefficiency or error within an area in the network environment.

SUMMARY

According to embodiments, systems and methods are provided for determining call muting areas within a network environment such that optimizations may be applied and service quality may be improved.

According to an aspect of the disclosure, a method of identifying call muting areas may include dividing a network cluster into a plurality of grids, determining a call muting percentage of at least one first grid of the plurality of grids, determining whether the call muting percentage of the at least one first grid is greater than a predetermined call muting percentage threshold, and generating at least one call muting polygon including at least a portion of the at least one first grid based on determining that the call muting percentage of the at least one first grid is greater than the predetermined call muting percentage threshold.

According to an aspect of the disclosure, a system for identifying call muting areas may include at least one memory storing instructions, and at least one processor configured to execute the instructions to divide a network cluster into a plurality of grids, determine a call muting percentage of at least one first grid of the plurality of grids, determine whether the call muting percentage of the at least one first grid is greater than a predetermined call muting percentage threshold, and generate at least one call muting polygon including at least a portion of the at least one first grid based on determining that the call muting percentage of the at least one first grid is greater than the predetermined call muting percentage threshold.

According to an aspect of the disclosure, a non-transitory computer-readable storage medium may store instructions that, when executed by at least one processor, cause the at least one processor to divide a network cluster into a plurality of grids, determine a call muting percentage of at least one first grid of the plurality of grids, determine whether the call muting percentage of the at least one first grid is greater than a predetermined call muting percentage threshold, and generate at least one call muting polygon including at least a portion of the at least one first grid based on determining that the call muting percentage of the at least one first grid is greater than the predetermined call muting percentage threshold.

Additional aspects will be set forth in part in the description that follows and, in part, will be apparent from the description, or may be realized by practice of the presented embodiments of the disclosure.

BRIEF DESCRIPTION OF THE DRAWINGS

Features, advantages, and significance of exemplary embodiments of the disclosure will be described below with reference to the accompanying drawings, in which like signs denote like elements, and wherein:

FIG. 6 is a flowchart of a method of identifying call muting areas according to an embodiment;

DETAILED DESCRIPTION

Figure 1:
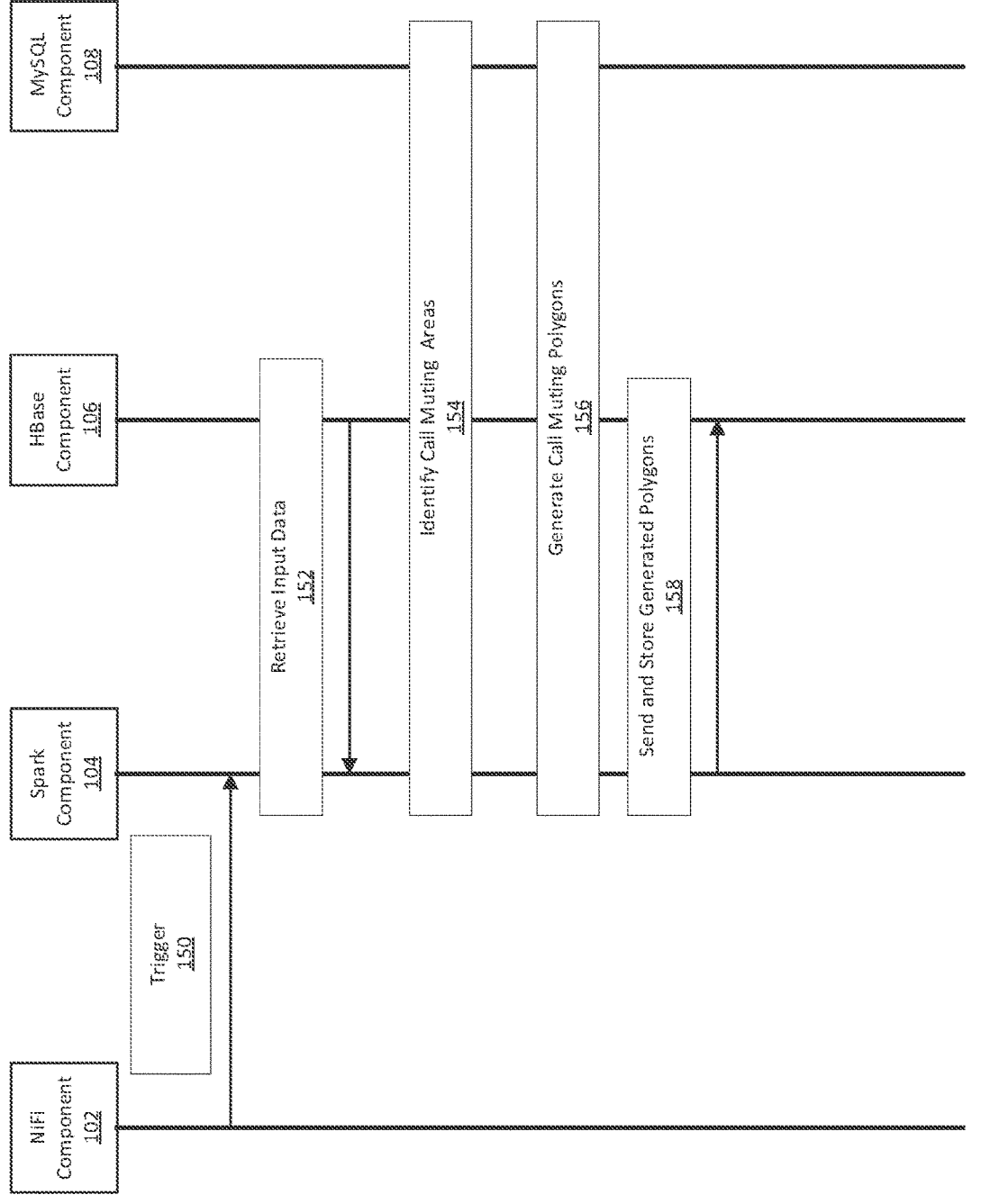
FIG. 1 is a diagram of an operation flow of a system for identifying call mutings, according to an embodiment.

The following detailed description of example embodiments refers to the accompanying drawings. The same reference numbers in different drawings may identify the same or similar elements.

The foregoing disclosure provides illustration and description, but is not intended to be exhaustive or to limit the implementations to the precise form disclosed. Modifications and variations are possible in light of the above disclosure or may be acquired from practice of the implementations. Further, one or more features or components of one embodiment may be incorporated into or combined with another embodiment (or one or more features of another embodiment). Additionally, in the flowcharts and descriptions of operations provided below, it is understood that one or more operations may be omitted, one or more operations may be added, one or more operations may be performed simultaneously (at least in part), and the order of one or more operations may be switched.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code. It is understood that software and hardware may be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Also, as used herein, the terms "has," "have," "having," "include," "including," or the like are intended to be open-ended terms. Further, the phrase "based on" is intended to mean "based, at least in part, on" unless explicitly stated otherwise. Furthermore, expressions such as "at least one of [A] and [B]" or "at least one of [A] or [B]" are to be understood as including only A, only B, or both A and B.

Example embodiments of the present disclosure provide a method and system through which call muting areas may be identified. The system may divide a network cluster into a plurality of grids, determine a call muting percentage of at least one first grid of the plurality of grids, determine whether the call muting percentage of the at least one first grid is greater than a predetermined call muting percentage threshold, and generate at least one call muting polygon including at least a portion of the at least one first grid based on determining that the call muting percentage of the at least one first grid is greater than the predetermined call muting percentage threshold. The call muting percentage of the at least one first grid is determined based on drive test data including call muting key performance indicator (KPI) of user equipments (UEs) in the at least one first grid.

By determining call muting areas, generating call muting polygons over geo-located data and assigning priorities to call muting areas based on unique user distributions, the system may effectively identify victim sites/responsible sites (e.g., base stations causing the call mutings) and perform area specific optimizations to reduce the call mutings.

FIG. 1 is a diagram of an operation flow of a system for identifying call mutings, according to an embodiment. The system may include a NiFi component 102, a spark component 104, an HBase component 106 and a MySQL component 108.

The NiFi component 102 may include a software design that is based on a flow-based programming model and offer features that prominently include the ability to operate within clusters. The NiFi component 102 may be used to ingest streaming data from third-party applications such as geo-located samples data from various enhanced messaging service (EMS) applications.

The spark component 104 may include a parallel processing framework for running large-scale data analytics applications across clustered computers. The spark component 104 may handle both batch and real-time analytics and data processing workloads.

The HBase component 106 may include a column-oriented non-relational database management system that runs on top of a Hadoop distributed file system (HDFS). The HBase component 106 may provide a fault-tolerant way of storing sparse data sets.

The MySQL component 108 may be configured for storage of processed data in the framework. The MySQL component 108 may be utilized for application programming interface (API) retrieval and for serving any real-time user interface (UI) requirements. The aggregated and correlated data may also be stored in the MySQL component 108.

In operation 150, the system may trigger the spark component 104, with the NiFi component 102 to initiate the process of identifying call muting areas. In operation 152, the spark component 104 may obtain input data from the HBase component 106. The input data may include drive test data retrieved from UEs that include key performance indicators (KPIs) (e.g., information, flags, etc.) indicating whether a call muting has occurred, geo-location data corresponding to the call mutings (e.g., level 4 (L4) geography), KPIs, etc., clutter data, including morphology data of the network area, boundary data, including cluster boundaries, region boundaries, grid boundaries, tile boundaries, etc. In operation 154, the system, via the spark component 104 and implementing the HBase component 106 and the MySQL component 108, may identify call muting areas. In operation 156, the system, via the spark component 104 and implementing the HBase component 106 and the MySQL component 108, may generate call muting polygons based on the identified call muting areas. In operation 158, the system may send the generated polygons from the spark component 104 to the HBase component 106 for storage.

Figure 2:
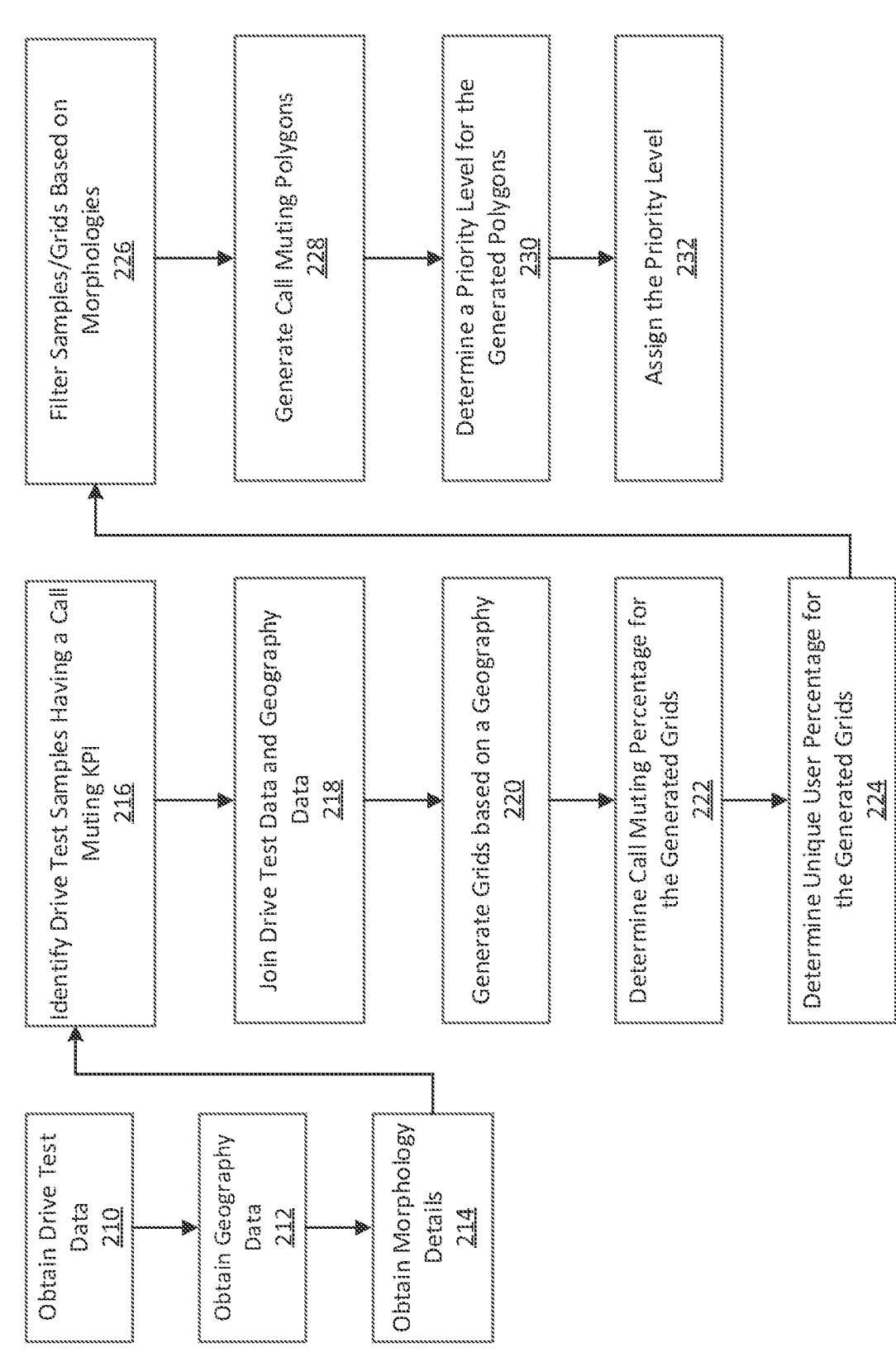
FIG. 2 is a diagram of an overall process of identifying call muting areas, according to an embodiment.

FIG. 2 is a diagram of an overall process of identifying call muting areas, according to an embodiment. Although operations 210-232 are shown in sequence, the operations may be performed in various orders without departing from the scope of the disclosure. In operation 210, the system may obtain drive test data. The drive test data may include KPIs indicating call mutings for UEs within a network cluster. The call muting KPIs may indicate muted calls in a grid. In operation 212, the system may obtain geography data. The geography data may include geo-location data of UEs and of call muting occurrences. In operation 214, the system may obtain morphology details. The morphology details may include morphological data corresponding to the network cluster and areas outside of the network cluster. The morphological data may include clutter data indicating a property of a geography, such as a spare forest area, a forest area, a barren area, a wet land area, an inland water area, a sea area, a low vegetation area, a population of an area, etc.

In operation 216, the system may identify drive test samples having a call muting KPI. That is, the system may identify call muting occurrences from the drive test data. The call muting KPI(s) may indicate calls in which voice data packets are dropped during the calls. In operation 218, the system may join the drive test data and the geography data. That is, the system may identify call muting occurrences from the drive test data, and then correspond the call muting occurrences with the geography data to determine a location of the call mutings. In operation 220, the system may generate grids based on a geography (e.g., based on the geography data). That is, the system may identify a network cluster within a network, and then divide the network cluster into a plurality of grids, as is shown with respect to FIGS. 3 and 4.

In operation 222, the system may determine a call muting percentage for the generated grids. That is, the system may determine an overall number of calls within a grid as well as an overall number of call mutings within the grid, and then determine a percentage of call mutings within the grid based on the previously determined values (i.e., the number of call mutings within the grid divided by the overall number of calls within the grid). In operation 224, the system may determine a unique user percentage for the generated grids. That is, the system may determine a number of unique users for the network cluster, as well as a number of unique users within a grid, and then determine a percentage of unique users in the grid based on the previously determined values (i.e., the number of unique users within the grid divided by the overall number of unique users for the network cluster).

In operation 226, the system may filter samples/grids based on morphologies. That is, the system may determine to discard drive test samples and/or grids within the network cluster based on the morphology data. For example, when the system determines, based on the morphology data, that the drive test sample and/or grid includes a property corresponding to a predetermined morphology condition, such as a spare forest area, a forest area, a barren area, a wet land area, an inland water area, a sea area, a low vegetation area, a population of an area, etc., the system may determine to discard the drive test sample corresponding to the location with the morphology condition, and/or to discard the grid having the predetermined morphology condition from consideration in generating call muting polygons.

In operation 228, the system may generate call muting polygons. The system may generate call muting polygons based on determining whether a call muting percentage for a grid is greater than (or greater than or equal to) a predetermined call muting percentage threshold (e.g., 10%-50%). The system may then generate polygons such that the polygons include at least a portion of the grid having a call muting percentage that is greater than (or greater than or equal to) the predetermined call muting percentage threshold.

In operation 230, the system may determine a priority level for the generated polygons. The priority level for the polygons may be generated based on the unique user percentage for a grid. For example, when the unique user percentage for a grid is greater than (or greater than or equal to) a predetermined unique user percentage threshold, the system may assign a high priority level for the grid, whereas when the unique user percentage for a grid is less than (or less than or equal to) a predetermined unique user percentage threshold, the system may assign a low priority level for the grid. In operation 232, the system may assign the priority levels to the grids. The priority level may correspond to a level indicating an importance or an order for optimizations/repairs to occur, such that grids with higher levels of priority are addressed before grids with lower levels of priority level.

Figure 3:
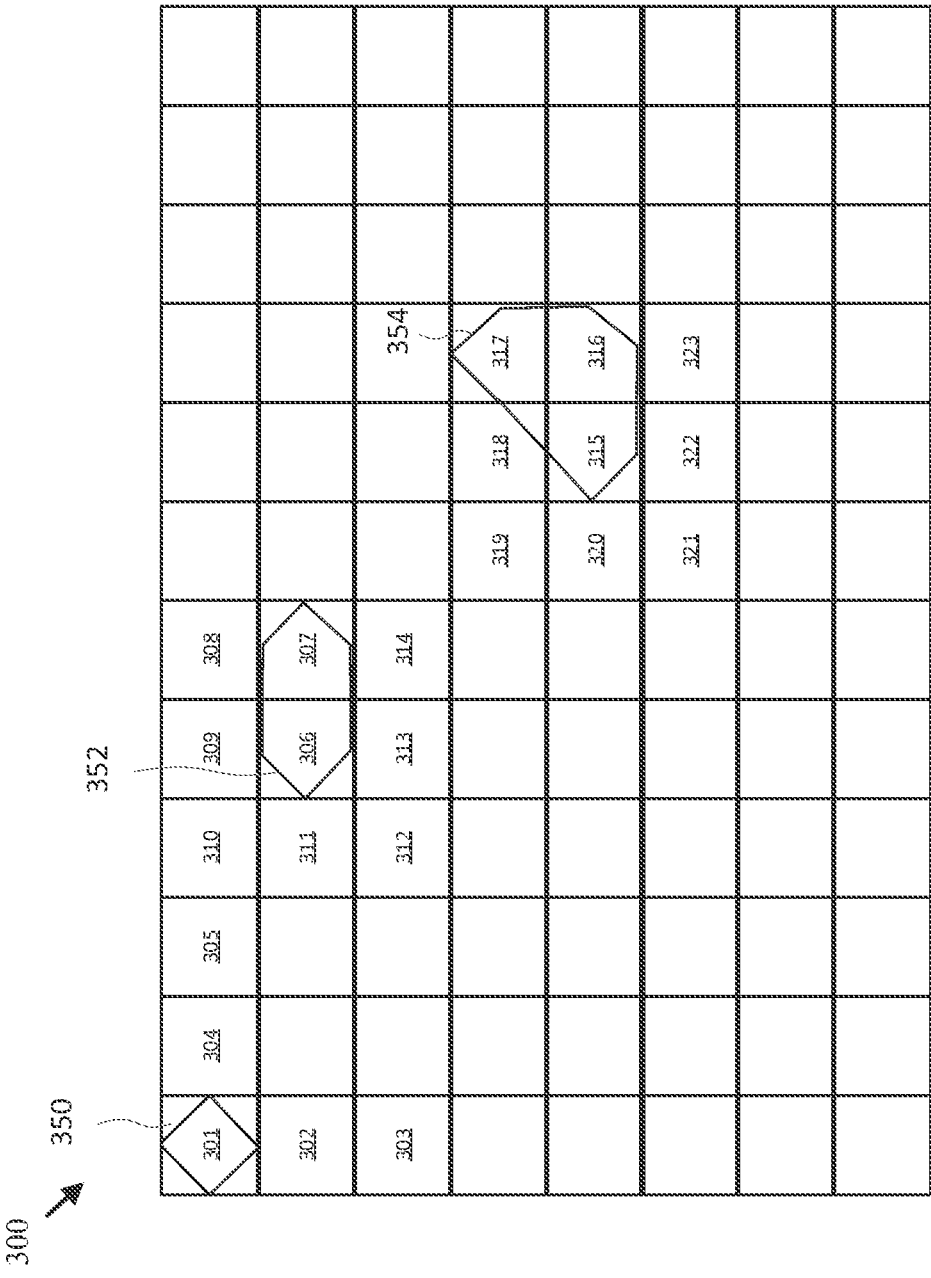
FIG. 3 is a diagram of a network cluster, according to an embodiment.

FIG. 3 is a diagram of a network cluster 300, according to an embodiment. The network cluster 300 may be partitioned into a plurality of grids, such as grids 301-323. In FIG. 3, the system may determine that a call muting percentage of grid 301 is greater than (or greater than or equal to) the predetermined call muting percentage threshold. Based on determining that the call muting percentage of grid 301 is greater than (or greater than or equal to) the predetermined call muting percentage threshold, the system may determine whether the call muting percentage of neighboring grids, such as grids 302 and 304, also have a call muting percentage that is greater than (or greater than or equal to) the predetermined call muting percentage threshold. In the example shown in FIG. 3, the system determines that neighboring grids 302 and 304 do not have call muting percentages greater than (or greater than or equal to) the predetermined call muting percentage threshold. Thus, the system generates a call muting polygon 350 based on grid 301. Although the shape of polygon 350 does not include all of grid 301, this is depicted for ease of description, and the shape of polygon 350 may vary according to various points in the grid 301. Furthermore, the polygon 350 may alternatively be generated to include all of grid 301.

In the example shown in FIG. 3, the system may determine that grid 306 has a call muting percentage that is greater than (or greater than or equal to) the predetermined call muting percentage threshold. Thereafter, the system may determine whether neighboring grids (i.e., grids 307-314) also have a call muting percentage that is greater than (or greater than or equal to) the predetermined call muting percentage threshold. As shown in FIG. 3, the system may determine that grid 307 also includes a call muting percentage that is greater than (or greater than or equal to) the predetermined call muting percentage threshold. Thus, the system may generate a call muting polygon 352 that includes at least a portion of grid 306 and a portion of grid 307. Polygon 352 may alternatively include all the area of grids 306 and 307. In response to determining that grid 307 has a call muting percentage that is greater than (or greater than or equal to) the predetermined call muting percentage threshold, the system may further determine whether neighboring grids to grid 307 have a call muting percentage that is greater than (or greater than or equal to) the predetermined call muting percentage threshold.

As further shown in FIG. 3, the system may determine that grid 315 has a call muting percentage that is greater than (or greater than or equal to) the predetermined call muting percentage threshold. The system may then determine whether the grids neighboring grid 315 (e.g., grids 316-323) have a call muting percentage that is greater than (or greater than or equal to) the predetermined call muting percentage threshold. In the example shown in FIG. 3, the system may determine that grids 316 and 317 have a call muting percentage that is greater than (or greater than or equal to) the predetermined call muting percentage threshold. Thereafter, the system may generate call muting polygon 354 including portions of grids 315-317. Polygon 354 may include all the area of grids 315-317. In response to determining that grids 316-317 has a call muting percentage that is greater than (or greater than or equal to) the predetermined call muting percentage threshold, the system may further determine whether neighboring grids to grids 316-317 have a call muting percentage that is greater than (or greater than or equal to) the predetermined call muting percentage threshold.

Figure 4A:
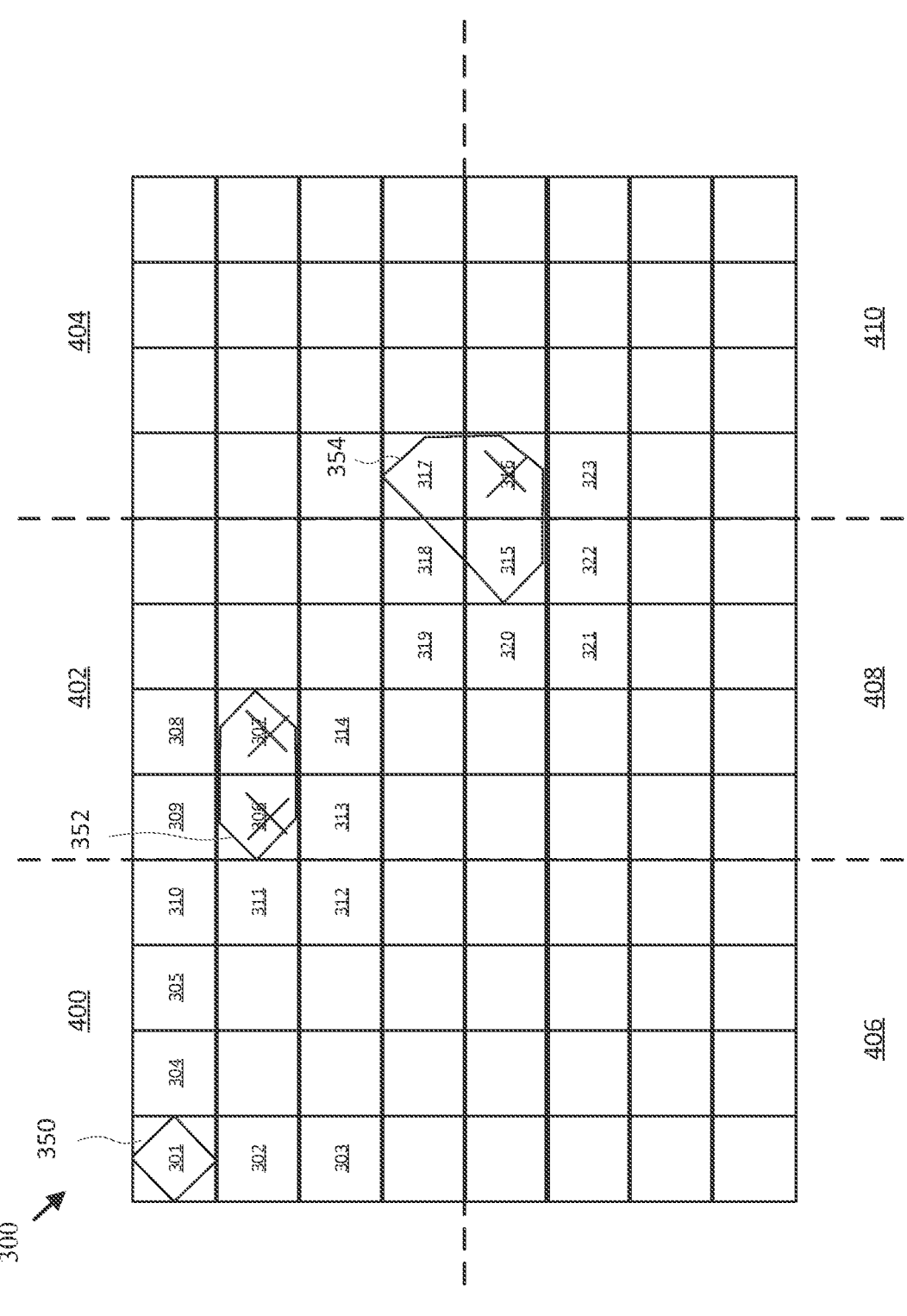
FIGS. 4A and 4B are diagrams of a network cluster, according to an embodiment.
Figure 4B:
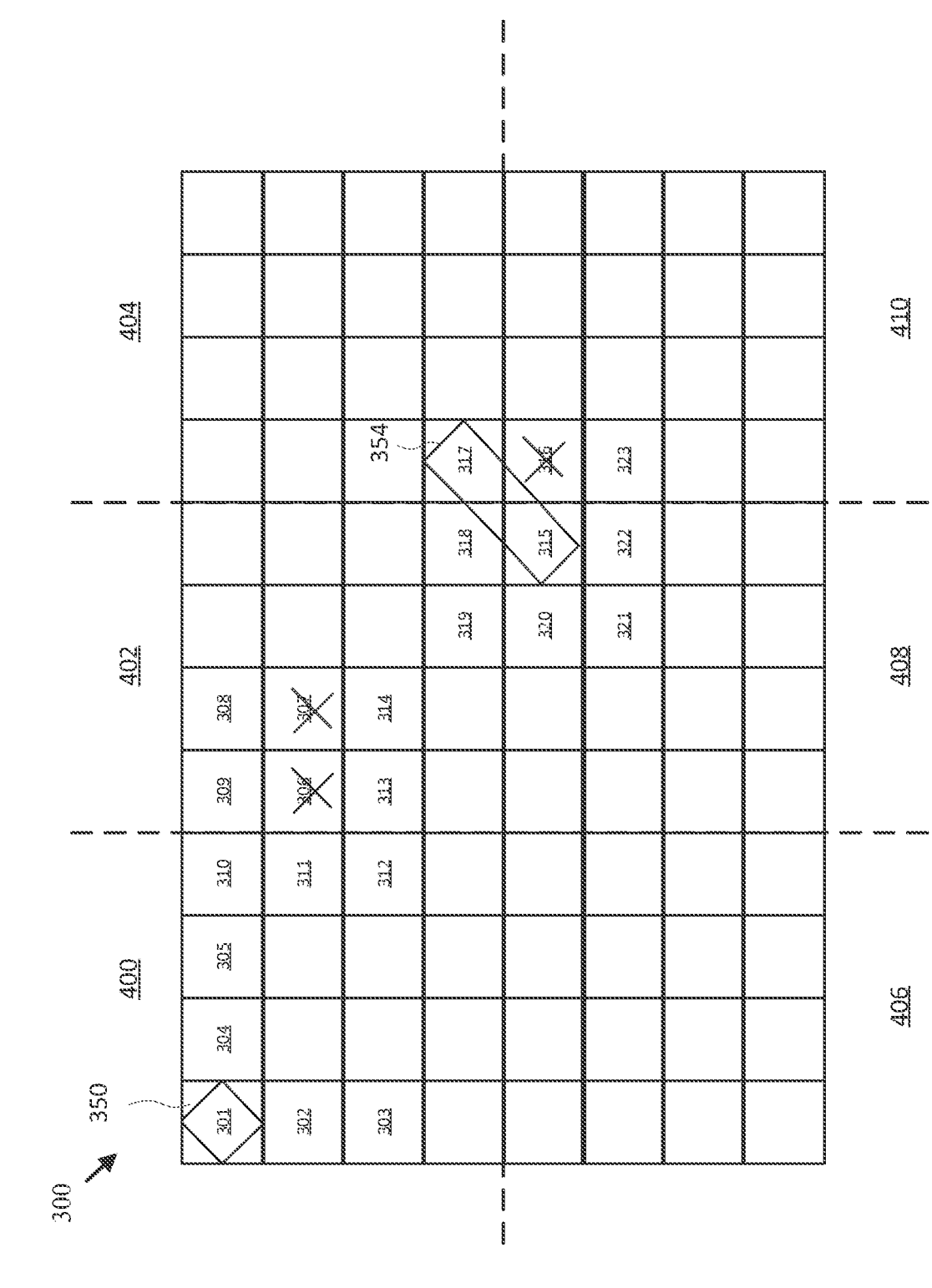

FIGS. 4A and 4B are diagrams of a network cluster 300, according to an embodiment. In FIG. 4A, the network cluster 300 is divided into six tiles, each tile including 16 grids. The tiles include the upper left tile 400, the upper middle tile 402, the upper right tile 404, the lower left tile 406, the lower middle tile 408 and the lower right tile 410. The system may obtain morphology data for each of the tiles. When the system determines, based on the morphology data, that a grid includes a property corresponding to a predetermined morphology condition, such as a spare forest area, a forest area, a barren area, a wet land area, an inland water area, a sea area, a low vegetation area, a population of an area, etc., the system may determine to discard the grid having the predetermined morphology condition from consideration in generating call muting polygons. As shown in the example of FIG. 4A, tile 400 does not include a predetermined morphology condition, and therefore grid 301 is not discarded and polygon 350 remains unchanged. Tile 402, however, does include a predetermined morphological condition, and therefore, the system may discard grids 306 and 307. Grids 306 and 307 may be discarded before generation of polygon 352 or after generation of polygon 352 depending on the system configuration. As shown in FIG. 4B, after discarding of grids in the tile 402 with the predetermined morphological condition, polygon 352 is removed.

Furthermore, the system may determine that tiles 404 and 408 do not include a predetermined morphological condition, but that tile 410 does include a predetermined morphological condition. Therefore, the system may determine to discard grid 316 while retaining grids 315 and 317. The system may discard grid 316 before generation of polygon 354 or after generation of polygon 354 depending on the system configuration. In examples where the system discards grid 316 after polygon 354 is generated, as shown in FIG. 4B, the system may reshape polygon 354 accordingly, or may otherwise ignore data sets occurring within grid 316 while maintaining the polygon 354.

Figure 5:
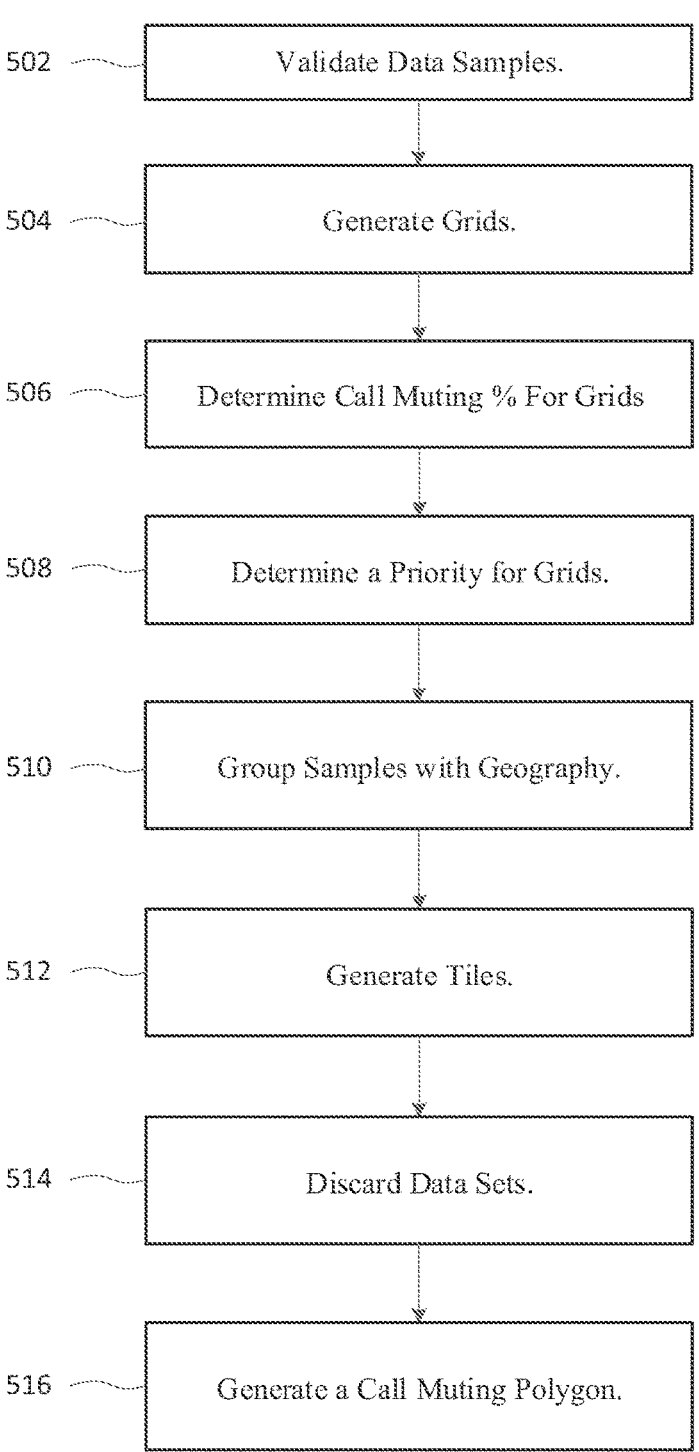
FIG. 5 is a flowchart of a method for generating a call muting polygon, according to an embodiment.

FIG. 5 is a flowchart of a method for generating a call muting polygon, according to an embodiment. Specific details regarding the operations of FIG. 5 are provided above, and repeated descriptions will be omitted. In operation 502, the system may validate data samples (e.g., drive test data, geography data, morphology data, etc.). In operation 504, the system may generate grids within a network cluster. In operation 506, the system may determine a call muting percentage for each of the grids. In operation 508, the system may determine a priority level for each of the grids. In operation 510, the system may group the data samples with geography data. In operation 512, the system may generate tiles for the network cluster. In operation 514, the system may discard data sets. In operation 516, the system may generate a call muting polygon.

The system may label the call muting polygons according to the following nomenclature: L4GeographyClusterName_Date_Band_Sequenc number. The L4GeographyClusterName may correspond to the L4 boundary name used for call muting area ID generation. The date may correspond to the date or date range to which the drive test data corresponds. The band may correspond to a unique number used for the frequency spectrum. The sequence number may correspond to a unique number indicating the call muting polygon in scenarios where, for example, a number of call muting polygons share a geography.

As disclosed herein, the call muting polygons may be assigned a priority level, and the priority levels may be determined based on weighted factors, such as an area of the call muting polygon, a morphology of the call muting polygon based on grid clutter and number of grids in a clutter type (e.g., the predetermined morphology condition), call muting samples, traffic volume, user density, presence of village/town (e.g., presence of area with population), etc. Weighted scores may be generated, and various priorities may be determined based on the weighted scores.

FIG. 6 is a flowchart of a method of identifying call muting areas according to an embodiment. In operation 602, the system may divide a network cluster into a plurality of grids. In operation 604, the system may determine a call muting percentage of at least one first grid of the plurality of grids. In operation 606, the system may determine whether the call muting percentage of the at least one first grid is greater than a predetermined call muting percentage threshold. In operation 608, the system may generate at least one call muting polygon including at least a portion of the at least one first grid based on determining that the call muting percentage of the at least one first grid is greater than the predetermined call muting percentage threshold.

The system may further determine a unique user percentage of the at least one first grid based on a first number of unique users in the at least one first grid and a second number of unique users in the network cluster, and assign a priority level to the at least one first grid based on the unique user percentage of the at least one first grid. Assigning the priority level may include assigning a high priority level based on the unique user percentage of the at least one first grid being greater than a predetermined unique user percentage threshold. Assigning the priority level may include assigning a low priority level based on the unique user percentage of the at least one first grid being less than a predetermined unique user percentage threshold.

The system may, based on determining that the call muting percentage of the at least one first grid is greater than the predetermined call muting percentage threshold, determine a call muting percentage of at least one second grid of the plurality of grids, and the at least one second grid neighboring the at least one first grid, determine whether the call muting percentage of the at least one second grid is greater than the predetermined call muting percentage threshold, where the at least one call muting polygon may include at least a portion of the at least one second grid based on determining that the call muting percentage of the at least one second grid is greater than the predetermined call muting percentage threshold.

The system may further divide the network cluster into a plurality of tiles, obtain morphology data corresponding to the plurality of tiles, determine, based on the morphology data, that at least one tile of the plurality of tiles includes a morphology that indicates that data sets obtained from grids within the at least one tile are to be discarded, determine that at least one grid of the plurality of grids is within the at least one tile, and discard data sets corresponding to the at least one grid that is within the at least one tile.

Figure 7:
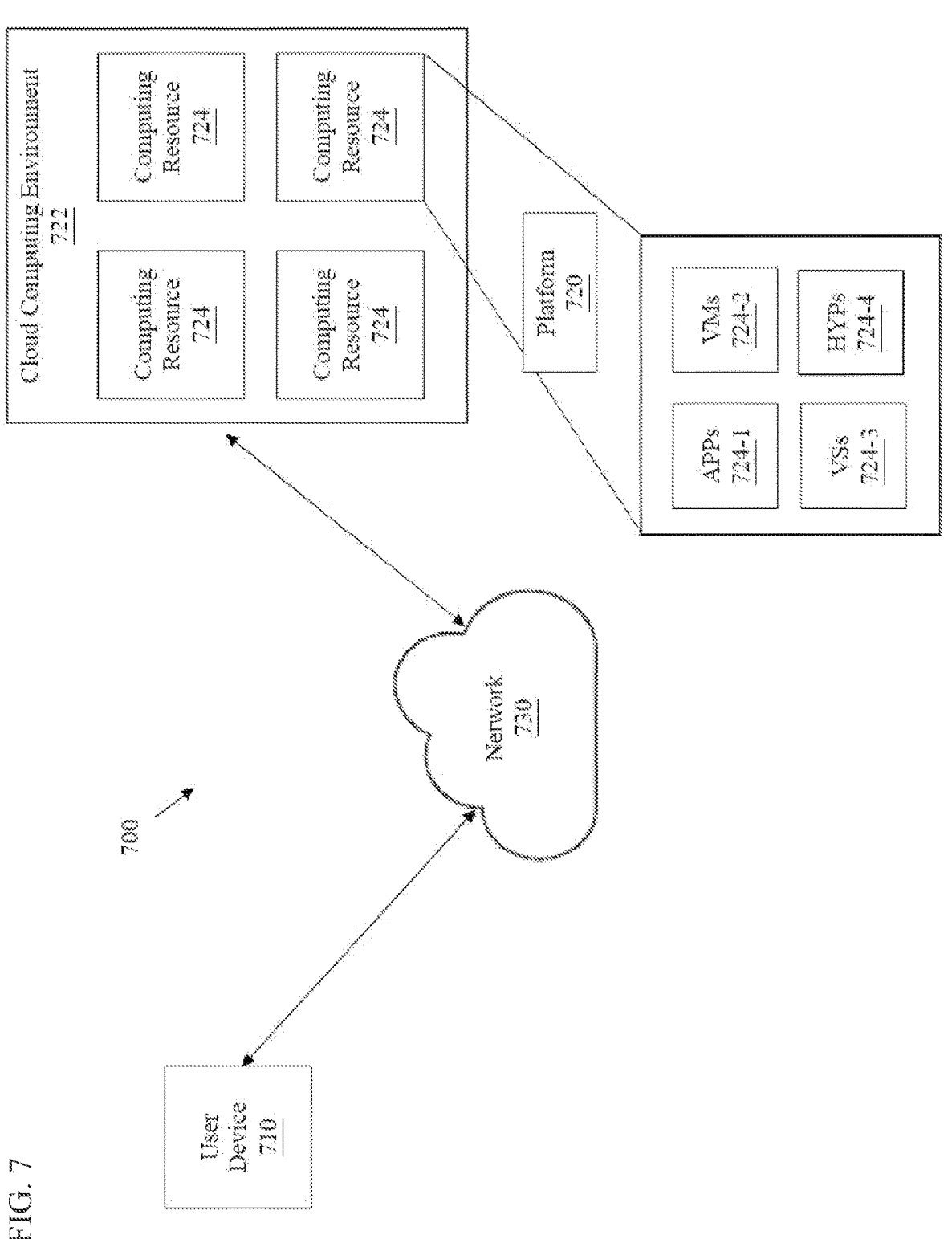
FIG. 7 is a diagram of an example environment in which systems and/or methods, described herein, may be implemented.

By determining call muting areas, generating call muting polygons over geo-located data and assigning priorities to call muting areas based on unique user distributions, the system may effectively identify victim sites/responsible sites (e.g., base stations causing the call mutings) and perform area specific optimizations to reduce the call mutings FIG. 7 is a diagram of an example environment 700 in which systems and/or methods, described herein, may be implemented. As shown in FIG. 7, environment 700 may include a user device 710, a platform 720, and a network 730. Devices of environment 700 may interconnect via wired connections, wireless connections, or a combination of wired and wireless connections. In embodiments, any of the functions and operations described with reference to FIG. 1 above may be performed by any combination of elements illustrated in FIG. 7.

User device 710 includes one or more devices capable of receiving, generating, storing, processing, and/or providing information associated with platform 720. For example, user device 710 may include a computing device (e.g., a desktop computer, a laptop computer, a tablet computer, a handheld computer, a smart speaker, a server, etc.), a mobile phone (e.g., a smart phone, a radiotelephone, etc.), a wearable device (e.g., a pair of smart glasses or a smart watch), or a similar device. In some implementations, user device 710 may receive information from and/or transmit information to platform 720.

Platform 720 includes one or more devices capable of receiving, generating, storing, processing, and/or providing information. In some implementations, platform 720 may include a cloud server or a group of cloud servers. In some implementations, platform 720 may be designed to be modular such that certain software components may be swapped in or out depending on a particular need. As such, platform 720 may be easily and/or quickly reconfigured for different uses.

In some implementations, as shown, platform 720 may be hosted in cloud computing environment 722. Notably, while implementations described herein describe platform 720 as being hosted in cloud computing environment 722, in some implementations, platform 720 may not be cloud-based (i.e., may be implemented outside of a cloud computing environment) or may be partially cloud-based.

Cloud computing environment 722 includes an environment that hosts platform 720. Cloud computing environment 722 may provide computation, software, data access, storage, etc. services that do not require end-user (e.g., user device 710) knowledge of a physical location and configuration of system(s) and/or device(s) that hosts platform 720. As shown, cloud computing environment 722 may include a group of computing resources 724 (referred to collectively as "computing resources 724" and individually as "computing resource 724").

Computing resource 724 includes one or more personal computers, a cluster of computing devices, workstation computers, server devices, or other types of computation and/or communication devices. In some implementations, computing resource 724 may host platform 720. The cloud resources may include compute instances executing in computing resource 724, storage devices provided in computing resource 724, data transfer devices provided by computing resource 724, etc. In some implementations, computing resource 724 may communicate with other computing resources 724 via wired connections, wireless connections, or a combination of wired and wireless connections.

As further shown in FIG. 7, computing resource 724 includes a group of cloud resources, such as one or more applications ("APPs") 724-1, one or more virtual machines ("VMs") 724-2, virtualized storage ("VSs") 724-3, one or more hypervisors ("HYPs") 724-4, or the like.

Application 724-1 includes one or more software applications that may be provided to or accessed by user device 710. Application 724-1 may eliminate a need to install and execute the software applications on user device 710. For example, application 724-1 may include software associated with platform 720 and/or any other software capable of being provided via cloud computing environment 722. In some implementations, one application 724-1 may send/receive information to/from one or more other applications 724-1, via virtual machine 724-2.

Virtual machine 724-2 includes a software implementation of a machine (e.g., a computer) that executes programs like a physical machine. Virtual machine 724-2 may be either a system virtual machine or a process virtual machine, depending upon use and degree of correspondence to any real machine by virtual machine 724-2. A system virtual machine may provide a complete system platform that supports execution of a complete operating system ("OS"). A process virtual machine may execute a single program, and may support a single process. In some implementations, virtual machine 724-2 may execute on behalf of a user (e.g., user device 710), and may manage infrastructure of cloud computing environment 722, such as data management, synchronization, or long-duration data transfers.

Virtualized storage 724-3 includes one or more storage systems and/or one or more devices that use virtualization techniques within the storage systems or devices of computing resource 724. In some implementations, within the context of a storage system, types of virtualizations may include block virtualization and file virtualization. Block virtualization may refer to abstraction (or separation) of logical storage from physical storage so that the storage system may be accessed without regard to physical storage or heterogeneous structure. The separation may permit administrators of the storage system flexibility in how the administrators manage storage for end users. File virtualization may eliminate dependencies between data accessed at a file level and a location where files are physically stored. This may enable optimization of storage use, server consolidation, and/or performance of non-disruptive file migrations.

Hypervisor 724-4 may provide hardware virtualization techniques that allow multiple operating systems (e.g., "guest operating systems") to execute concurrently on a host computer, such as computing resource 724. Hypervisor 724-4 may present a virtual operating platform to the guest operating systems, and may manage the execution of the guest operating systems. Multiple instances of a variety of operating systems may share virtualized hardware resources.

Network 730 includes one or more wired and/or wireless networks. For example, network 730 may include a cellular network (e.g., a fifth generation (5G) network, a long-term evolution (LTE) network, a third generation (3G) network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, or the like, and/or a combination of these or other types of networks.

The number and arrangement of devices and networks shown in FIG. 7 are provided as an example. In practice, there may be additional devices and/or networks, fewer devices and/or networks, different devices and/or networks, or differently arranged devices and/or networks than those shown in FIG. 7. Furthermore, two or more devices shown in FIG. 7 may be implemented within a single device, or a single device shown in FIG. 7 may be implemented as multiple, distributed devices. Additionally, or alternatively, a set of devices (e.g., one or more devices) of environment 700 may perform one or more functions described as being performed by another set of devices of environment 700.

Figure 8:
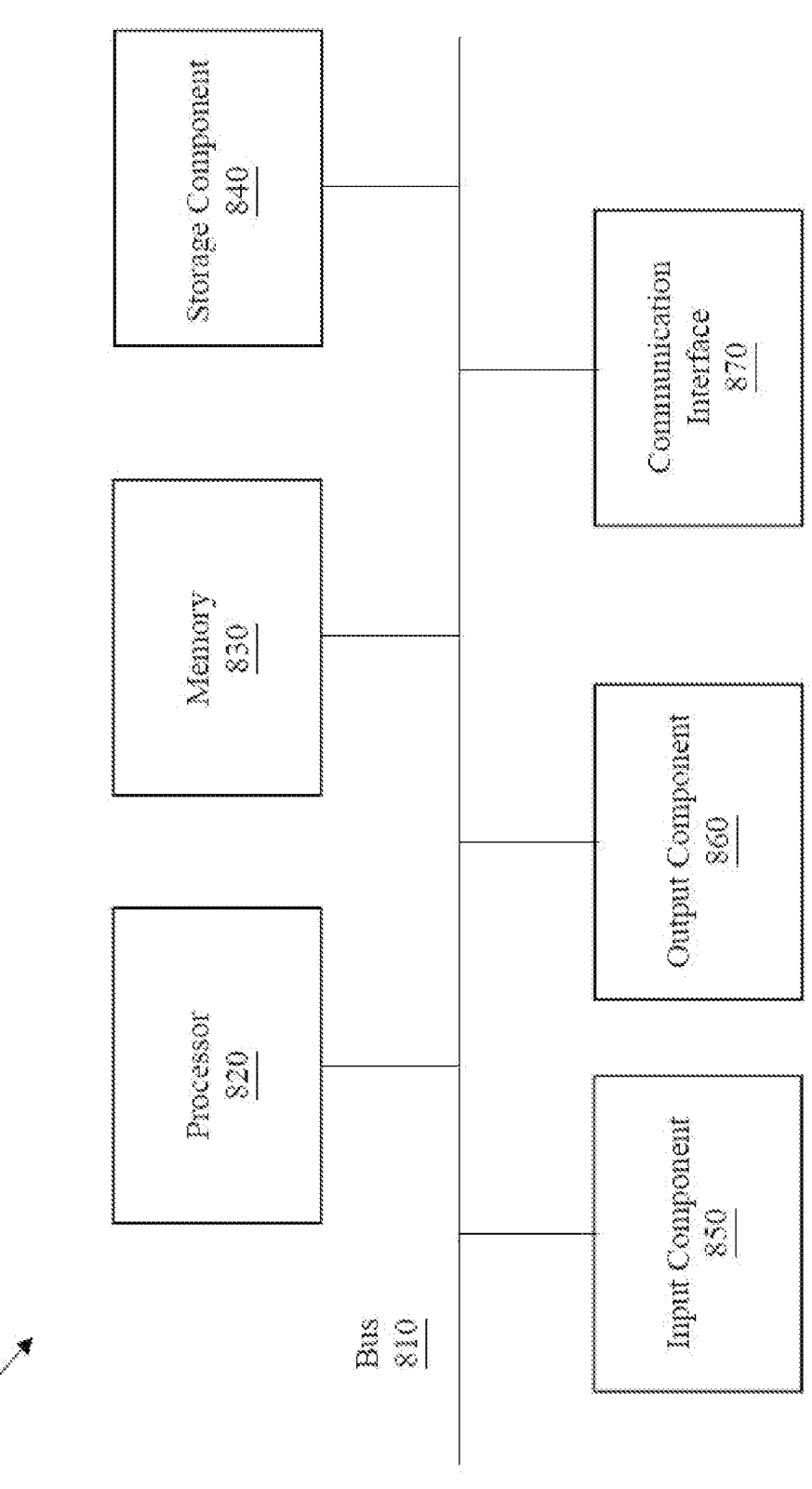
FIG. 8 is a diagram of example components of a device according to an embodiment.

FIG. 8 is a diagram of example components of a device 800. Device 800 may correspond to user device 710 and/or platform 720. As shown in FIG. 8, device 800 may include a bus 810, a processor 820, a memory 830, a storage component 840, an input component 850, an output component 860, and a communication interface 870.

Bus 810 includes a component that permits communication among the components of device 800. Processor 820 may be implemented in hardware, firmware, or a combination of hardware and software. Processor 820 may be a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 820 includes one or more processors capable of being programmed to perform a function. Memory 830 includes a random access memory (RAM), a read only memory (ROM), and/or another type of dynamic or static storage device (e.g., a flash memory, a magnetic memory, and/or an optical memory) that stores information and/or instructions for use by processor 820.

Storage component 840 stores information and/or software related to the operation and use of device 800. For example, storage component 840 may include a hard disk (e.g., a magnetic disk, an optical disk, a magneto-optic disk, and/or a solid state disk), a compact disc (CD), a digital versatile disc (DVD), a floppy disk, a cartridge, a magnetic tape, and/or another type of non-transitory computer-readable medium, along with a corresponding drive. Input component 850 includes a component that permits device 800 to receive information, such as via user input (e.g., a touch screen display, a keyboard, a keypad, a mouse, a button, a switch, and/or a microphone). Additionally, or alternatively, input component 850 may include a sensor for sensing information (e.g., a global positioning system (GPS) component, an accelerometer, a gyroscope, and/or an actuator). Output component 860 includes a component that provides output information from device 800 (e.g., a display, a speaker, and/or one or more light-emitting diodes (LEDs)).

Communication interface 870 includes a transceiver-like component (e.g., a transceiver and/or a separate receiver and transmitter) that enables device 800 to communicate with other devices, such as via a wired connection, a wireless connection, or a combination of wired and wireless connections. Communication interface 870 may permit device 800 to receive information from another device and/or provide information to another device. For example, communication interface 870 may include an Ethernet interface, an optical interface, a coaxial interface, an infrared interface, a radio frequency (RF) interface, a universal serial bus (USB) interface, a Wi-Fi interface, a cellular network interface, or the like.

Device 800 may perform one or more processes described herein. Device 800 may perform these processes in response to processor 820 executing software instructions stored by a non-transitory computer-readable medium, such as memory 830 and/or storage component 840. A computer-readable medium is defined herein as a non-transitory memory device. A memory device includes memory space within a single physical storage device or memory space spread across multiple physical storage devices.

Software instructions may be read into memory 830 and/or storage component 840 from another computer-readable medium or from another device via communication interface 870. When executed, software instructions stored in memory 830 and/or storage component 840 may cause processor 820 to perform one or more processes described herein.

Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 8 are provided as an example. In practice, device 800 may include additional components, fewer components, different components, or differently arranged components than those shown in FIG. 8. Additionally, or alternatively, a set of components (e.g., one or more components) of device 800 may perform one or more functions described as being performed by another set of components of device 800.

In embodiments, any one of the operations or processes of FIGS. 1-6 may be implemented by or using any one of the elements illustrated in FIGS. 7 and 8.

The foregoing disclosure provides illustration and description, but is not intended to be exhaustive or to limit the implementations to the precise form disclosed. Modifications and variations are possible in light of the above disclosure or may be acquired from practice of the implementations.

Some embodiments may relate to a system, a method, and/or a computer readable medium at any possible technical detail level of integration. Further, one or more of the above components described above may be implemented as instructions stored on a computer readable medium and executable by at least one processor (and/or may include at least one processor). The computer readable medium may include a computer-readable non-transitory storage medium (or media) having computer readable program instructions thereon for causing a processor to carry out operations.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program code/instructions for carrying out operations may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects or operations.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer readable media according to various embodiments. In this regard, each block in the flowchart or block diagrams may represent a module, segment, or portion of instructions, which comprises one or more executable instructions for implementing the specified logical function(s). The method, computer system, and computer readable medium may include additional blocks, fewer blocks, different blocks, or differently arranged blocks than those depicted in the Figures. In some alternative implementations, the functions noted in the blocks may occur out of the order noted in the Figures. For example, two blocks shown in succession may, in fact, be executed concurrently or substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware may be designed to implement the systems and/or methods based on the description herein.

What is claimed is:

1. A method of identifying call muting areas, the method comprising:
   dividing a network cluster into a plurality of grids;
   determining a call muting percentage of at least one first grid of the plurality of grids, the call muting percentage indicating a percentage of calls in which voice data packets are dropped but the calls remain connected during dropping of the voice data packets;
   determining whether the call muting percentage of the at least one first grid is greater than a predetermined call muting percentage threshold; and
   generating at least one call muting polygon comprising at least a portion of the at least one first grid based on determining that the call muting percentage of the at least one first grid is greater than the predetermined call muting percentage threshold.

2. The method of claim 1, wherein the call muting percentage of the at least one first grid is determined based on drive test data comprising call muting key performance indicator (KPI) of user equipments (UEs) in the at least one first grid, the call muting KPIs indicating calls in which the voice data packets are dropped during the calls such that the calls remain connected during the dropping of the voice data packets.

3. The method of claim 1, further comprising:
   determining a unique user percentage of the at least one first grid based on a first number of unique users in the at least one first grid and a second number of unique users in the network cluster; and
   assigning a priority level to the at least one first grid based on the unique user percentage of the at least one first grid.

4. The method of claim 3, wherein assigning the priority level comprises assigning a high priority level based on the unique user percentage of the at least one first grid being greater than a predetermined unique user percentage threshold.

5. The method of claim 3, wherein assigning the priority level comprises assigning a low priority level based on the unique user percentage of the at least one first grid being less than a predetermined unique user percentage threshold.

6. The method of claim 1, further comprising, based on determining that the call muting percentage of the at least one first grid is greater than the predetermined call muting percentage threshold:
   determining a call muting percentage of at least one second grid of the plurality of grids, the at least one second grid neighboring the at least one first grid; and
   determining whether the call muting percentage of the at least one second grid is greater than the predetermined call muting percentage threshold,
   wherein the at least one call muting polygon comprises a same polygon including the at least the portion of the at least one first grid and at least a portion of the at least one second grid based on determining that the call muting percentage of the at least one second grid is greater than the predetermined call muting percentage threshold.

7. The method of claim 1, further comprising:
   dividing the network cluster into a plurality of tiles; and

obtaining morphology data corresponding to the plurality of tiles.

8. The method of claim 7, further comprising:
determining, based on the morphology data, that at least one tile of the plurality of tiles comprises a morphology that indicates that data sets obtained from grids within the at least one tile are to be discarded;
determining that at least one grid of the plurality of grids is within the at least one tile; and
discarding data sets corresponding to the at least one grid that is within the at least one tile.

9. A system for identifying call muting areas, the system comprising:
at least one memory storing instructions; and
at least one processor configured to execute the instructions to:
divide a network cluster into a plurality of grids;
determine a call muting percentage of at least one first grid of the plurality of grids, the call muting percentage indicating a percentage of calls in which voice data packets are dropped but the calls remain connected during dropping of the voice data packets;
determine whether the call muting percentage of the at least one first grid is greater than a predetermined call muting percentage threshold; and
generate at least one call muting polygon comprising at least a portion of the at least one first grid based on determining that the call muting percentage of the at least one first grid is greater than the predetermined call muting percentage threshold.

10. The system of claim 9, wherein the call muting percentage of the at least one first grid is determined based on drive test data comprising call muting key performance indicator (KPI) of user equipments (UEs) in the at least one first grid, the call muting KPIs indicating calls in which the voice data packets are dropped during the calls such that the calls remain connected during the dropping of the voice data packets.

11. The system of claim 9, wherein the at least one processor is further configured to execute the instructions to:
determine a unique user percentage of the at least one first grid based on a first number of unique users in the at least one first grid and a second number of unique users in the network cluster; and
assign a priority level to the at least one first grid based on the unique user percentage of the at least one first grid.

12. The system of claim 11, wherein the at least one processor is further configured to execute the instructions to assign the priority level by assigning a high priority level based on the unique user percentage of the at least one first grid being greater than a predetermined unique user percentage threshold.

13. The system of claim 11, wherein the at least one processor is further configured to execute the instructions to assign the priority level by assigning a low priority level based on the unique user percentage of the at least one first grid being less than a predetermined unique user percentage threshold.

14. The system of claim 9, wherein, based on determining that the call muting percentage of the at least one first grid is greater than the predetermined call muting percentage threshold, the at least one processor is further configured to execute the instructions to:
determine a call muting percentage of at least one second grid of the plurality of grids, the at least one second grid neighboring the at least one first grid; and

determine whether the call muting percentage of the at least one second grid is greater than the predetermined call muting percentage threshold,
wherein the at least one call muting polygon comprises a same polygon including the at least the portion of the at least one first grid and at least a portion of the at least one second grid based on determining that the call muting percentage of the at least one second grid is greater than the predetermined call muting percentage threshold.

15. The system of claim 9, wherein the at least one processor is further configured to execute the instructions to:
divide the network cluster into a plurality of tiles; and
obtain morphology data corresponding to the plurality of tiles.

16. The system of claim 15, wherein the at least one processor is further configured to execute the instructions to:
determine, based on the morphology data, that at least one tile of the plurality of tiles comprises a morphology that indicates that data sets obtained from grids within the at least one tile are to be discarded;
determine that at least one grid of the plurality of grids is within the at least one tile; and
discard data sets corresponding to the at least one grid that is within the at least one tile.

17. A non-transitory computer-readable storage medium storing instructions that, when executed by at least one processor, cause the at least one processor to:
divide a network cluster into a plurality of grids;
determine a call muting percentage of at least one first grid of the plurality of grids, the call muting percentage indicating a percentage of calls in which voice data packets are dropped but the calls remain connected during dropping of the voice data packets;
determine whether the call muting percentage of the at least one first grid is greater than a predetermined call muting percentage threshold; and
generate at least one call muting polygon comprising at least a portion of the at least one first grid based on determining that the call muting percentage of the at least one first grid is greater than the predetermined call muting percentage threshold.

18. The storage medium of claim 17, wherein the call muting percentage of the at least one first grid is determined based on drive test data comprising call muting key performance indicator (KPI) of user equipments (UEs) in the at least one first grid, the call muting KPIs indicating calls in which the voice data packets are dropped during the calls such that the calls remain connected during the dropping of the voice data packets.

19. The storage medium of claim 17, wherein the instructions, when executed, further cause the at least one processor to:
determine a unique user percentage of the at least one first grid based on a first number of unique users in the at least one first grid and a second number of unique users in the network cluster; and
assign a priority level to the at least one first grid based on the unique user percentage of the at least one first grid.

20. The storage medium of claim 19, wherein the instructions, when executed, cause the at least one processor to assign the priority level by assigning a high priority level based on the unique user percentage of the at least one first grid being greater than a predetermined unique user percentage threshold.

* * * * *